United States Patent
Föhl

[11] Patent Number: 5,149,134
[45] Date of Patent: Sep. 22, 1992

[54] SAFETY MECHANISM FOR A SAFETY BELT PRETENSIONER

[75] Inventor: Artur Föhl, Schorndorf, Fed. Rep. of Germany

[73] Assignee: TRW Repa GmbH, Alfdorf, Fed. Rep. of Germany

[21] Appl. No.: 698,294

[22] Filed: May 10, 1991

[30] Foreign Application Priority Data

May 15, 1990 [EP] European Pat. Off. ......... 90109106.6

[51] Int. Cl.$^5$ ..................... B60R 22/46; B60R 21/32
[52] U.S. Cl. ................................. 280/806; 180/282
[58] Field of Search ............... 280/806, 734, 735; 180/282; 297/480; 200/61.45 R, 61.53; 73/514, 493

[56] References Cited

U.S. PATENT DOCUMENTS

| | | | |
|---|---|---|---|
| 2,986,615 | 5/1961 | Hardway | 200/61.45 R |
| 3,848,695 | 11/1974 | Lacaze | 280/735 |
| 3,916,376 | 10/1975 | Tuttle | 280/735 |
| 4,161,228 | 7/1979 | Svensson et al. | 200/61.53 |
| 4,251,091 | 2/1981 | Weissner | 242/107.4 A |
| 4,573,706 | 3/1986 | Breed | 280/734 |
| 4,932,722 | 6/1990 | Motozawa | 180/282 |

FOREIGN PATENT DOCUMENTS

0417670  3/1991  European Pat. Off. ............. 280/734

Primary Examiner—Karin L. Tyson
Attorney, Agent, or Firm—Tarolli, Sundheim & Covell

[57] ABSTRACT

The vehicle-sensitive inertia mass of a control mechanism for a pretensioner in a safety belt restraining system is secured in a safety position by a blocking means engaging on the inertia mass to inhibit operation of said pretensioner. A sensing pin senses the approach of the housing of the control mechanism to a part of the vehicle bodywork in the mounting of the housing on said part of the vehicle bodywork and converts said approach to an actuating travel which causes the blocking means to release the inertia mass.

8 Claims, 7 Drawing Sheets

SAFETY MECHANISM FOR A SAFETY BELT PRETENSIONER

The invention relates to a safety mechanism in a pretensioner of a safety belt restraining system or in a gas bag restraining system for vehicles.

Restraining systems of this type include a control mechanism with an inertia mass movably accommodated in a housing. Such a control mechanism may be integrated with the pretensioner and possibly also with a belt retractor to form a compact assembly which is installed as a finished module in a vehicle. The inertia mass constitutes a mechanical vehicle-sensitive sensor by triggering of which the pretensioner is activated.

However, such a sensor also responds to shocks or impacts which exceed a predetermined threshold value. To avoid occasionally occurring impacts in manipulating the installed module leading to activation of the pretensioner, inhibiting means may be provided to secure the sensor in its readiness state until the module is mounted in the vehicle.

The invention provides a safety mechanism whereby the inhibiting means are automatically disabled on assembly of the control mechanism in the vehicle, so that no special steps need be taken to ensure that the pretensioner is ready for operation after and only after assembly.

This is achieved with a safety mechanism wherein a control element directly or via a sensing lever senses the approach of a housing accommodating the functional parts of the control mechanism, or of a functional unit fixedly connected thereto, towards a part of the vehicle bodywork on assembly of the housing or of the functional unit fixedly connected thereto on said part of the vehicle bodywork to convert said approach to an actuating travel whereby the inhibiting means which normally inhibit operation of the pretensioner or gas bag system are disabled. Prior to assembly, the control mechanism is in a safety condition; by the assembly operation as such the control element is actuated for bringing the inhibiting means into the disabled state. Preferably, this operation is reversible, so that on any removal of the control mechanism the latter is again automatically secured in the safety condition. Thus, in the handling and assembly of such a control mechanism there is no need to pay any attention at all either to the securing against unintentional activation of the pretensioner or to the cancelling of the securing for bringing the pretensioner into its operational state. This results not only in a saving as regards the assembly expenditure but above all in a gain of safety by eliminating any danger of injury on unintentional activation of the pretensioner or gas bag system.

If the housing of the control mechanism is mounted directly on a surface of the vehicle bodywork, the control element is preferably formed as sensing pin which is slidingly mounted in a bore of the housing and projects out of the outer surface of the housing which on mounting thereof comes to bear on a surface of the vehicle bodywork. On mounting, the part of the sensing pin initially projecting out is then pressed into the bore of the housing.

If the control mechanism is integrated with a pretensioner and possibly also with a belt retractor to a unitary assembly, generally the housing cannot be secured directly to the vehicle bodywork. On the contrary, the housing of the control mechanism must be mounted on the mounting base of the pretensioner which in turn is mounted on a surface of the vehicle bodywork. If the assembly also includes the belt retractor, the loadbearing frame of the latter is secured to the vehicle bodywork and the pretensioner as well as the housing of the control mechanism are secured to the frame of the belt retractor. In such embodiments the control element of the safety mechanism is preferably actuated via a two-armed sensing lever which is pivotally mounted on the housing and has a sensing end which upon assembly moves out of its safety position into an actuated position in that it comes to bear on a part of the vehicle bodywork or on an assembly part which is required for installation of the assembly, for example a mounting screw which with its end remote from the screw head, when fully screwed in, presses against the sensing end to actuate the sensing lever.

Further features and advantages of the invention will be apparent from the following description of several examples of embodiment and from the drawings to which reference is made and in which.

Figure 1:
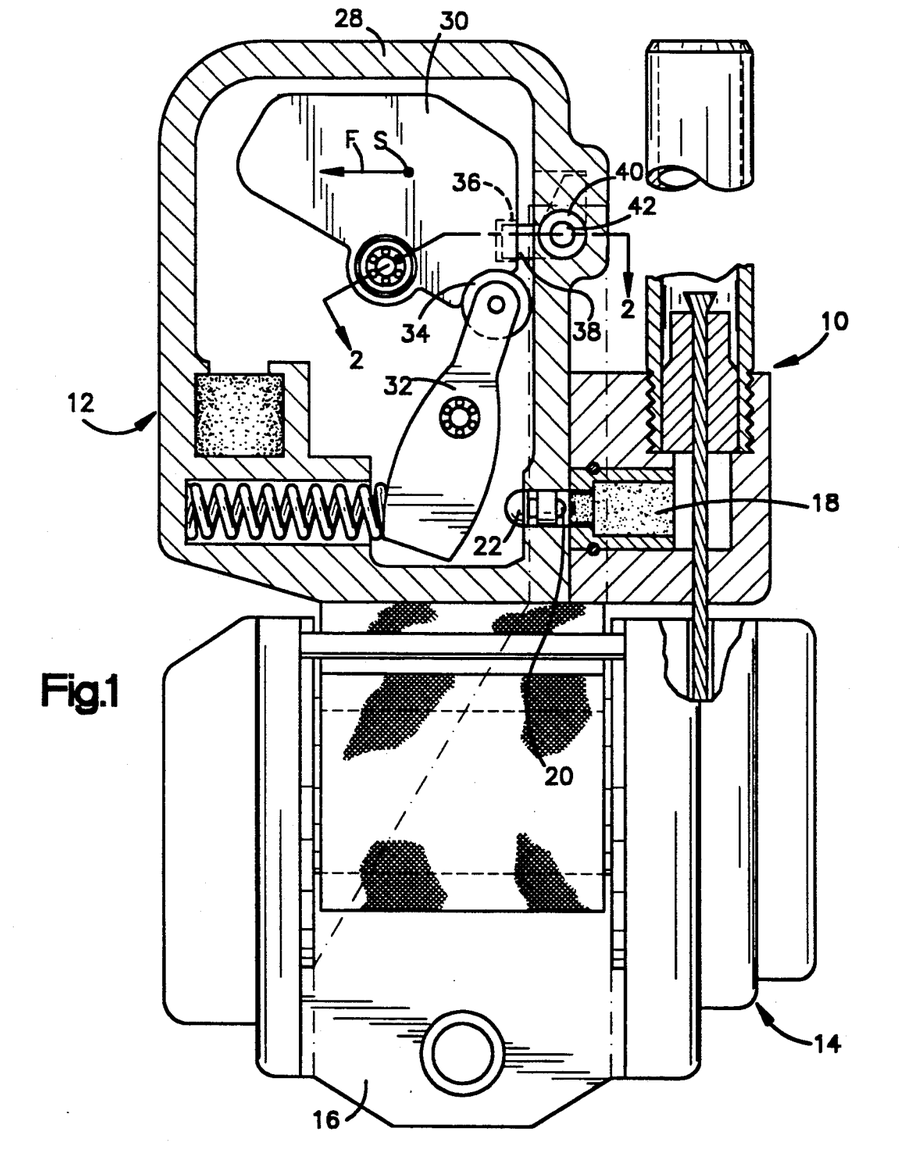
FIG. 1 is a partially sectioned view of an embodiment in which a pretensioner, a control mechanism and a belt retractor are integrated to form one assembly.

In the embodiment shown in FIG. 1 a pyrotechnical pretensioner, denoted generally by 10, a control mechanism 12 associated therewith and a safety belt retractor 14 are integrated to form one component assembly. Mounting of this assembly is by means of the loadbearing housing of the belt retractor 14 which is provided for this purpose on its housing with a mounting flange 16. The pretensioner 10 consists in a manner known per se of a pyrotechnical piston/cylinder linear drive, the piston movement of which is transmitted by a pulling cable to a pulley which is couplable to the belt spool of the belt retractor 14. The pyrotechnical charge 18 of the pretensioner is activated by means of an impact igniter 20 which in turn is triggered by a firing pin 22. The firing pin 22 is mounted displaceably in a bore of a housing 28 of the control mechanism 12. Also mounted for easy pivotal motion in said housing 28 is a vehicle-sensitive inertia mass 30. A spring-loaded strike piece 32 in the form of a pivotally mounted two-arm lever bears with a roller 34 in a concave recess of the inertia mass 30. In the readiness state shown in FIG. 1 the one arm of the strike piece 32 lies opposite and spaced from the head of the firing pin 22 projecting into the housing. The configuration of the control curve or cam formed by the concave recess on the inertia mass 30 governs the trigger threshold at which the inertia mass 30 under the action of deceleration forces applied at its center S of gravity pivots anticlockwise in the direction of an arrow F to release the strike piece 32 so that the latter, under the action of the spring loading, is accelerated towards the firing pin 22 until it strikes the latter and drives it into the impact igniter 20.

Figure 2:
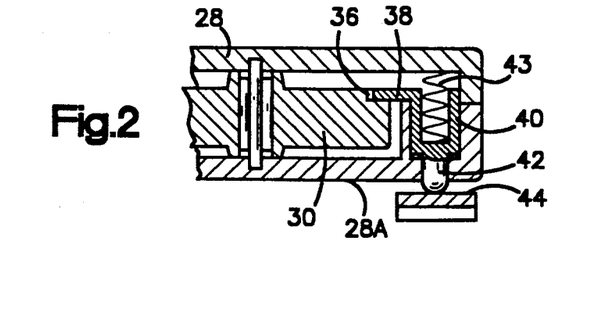
FIG. 2 is a partial section of the control mechanism in the embodiment shown in FIG. 1.

The inertia mass 30 is provided with a recess 36 in its main surface which is parallel to the pivot plane of the inertia mass. Said recess 36 is made in its configuration to correspond to a blocking extension 38 of a control element 40 so that said blocking extension 38 can engage into the recess 36 to secure the inertia mass 30 in its readiness position shown in FIG. 1. The control element 40 is a hollow pin which is slidingly guided in a bore of the housing 28 and from the inner end of which the blocking extension 38 projects perpendicularly. The cavity of the control element 40 accommodates a pressure spring 43 which bears on the opposite inner wall of the housing 28 and acts on the blocking element in the sense that the blocking extension 38 is held in engagement with the recess 36. In this state, a tapered end of the control element 40, forming a sensing pin 42, projects outwardly from the stepped bore of the housing 28 and with its free end projects over an outer surface 28A of the housing 28. On mounting the assembly, said surface 28A is brought at least partially into engagement with an oppositely disposed mounting surface of the vehicle bodywork. Said mounting surface is indicated schematically at 44 in FIG. 2. FIG. 2 shows the condition at the start of the assembly: The sensing pin 42 made integral with the control element 40 already engages with its sensing surface the oppositely disposed mounting surface 44 of the vehicle bodywork. With increasing approach of the surfaces 28A and 44 to each other the sensing pin 42 is pressed into the housing so that the blocking extension 38 moves out of the cutout or recess 36 and finally releases the inertia mass 30 so that the drive mechanism is no longer secured in the safety position. For any necessary removal of the assembly the sensing pin 42 is again pressed outwardly by the pressure spring 43 so that the inertia mass 30 is again secured.

Figure 3:
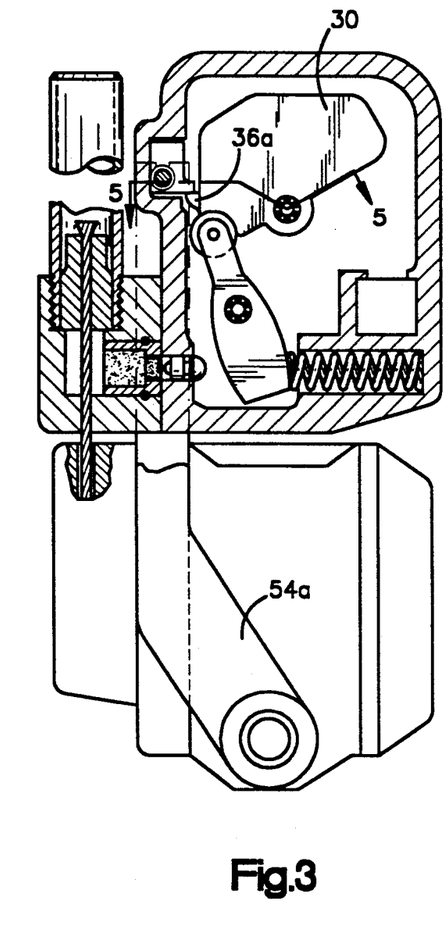
FIGS. 3 to 5 show a second embodiment in which likewise a pretensioner, its control mechanism and a belt retractor are integrated to form one assembly.
Figure 4:
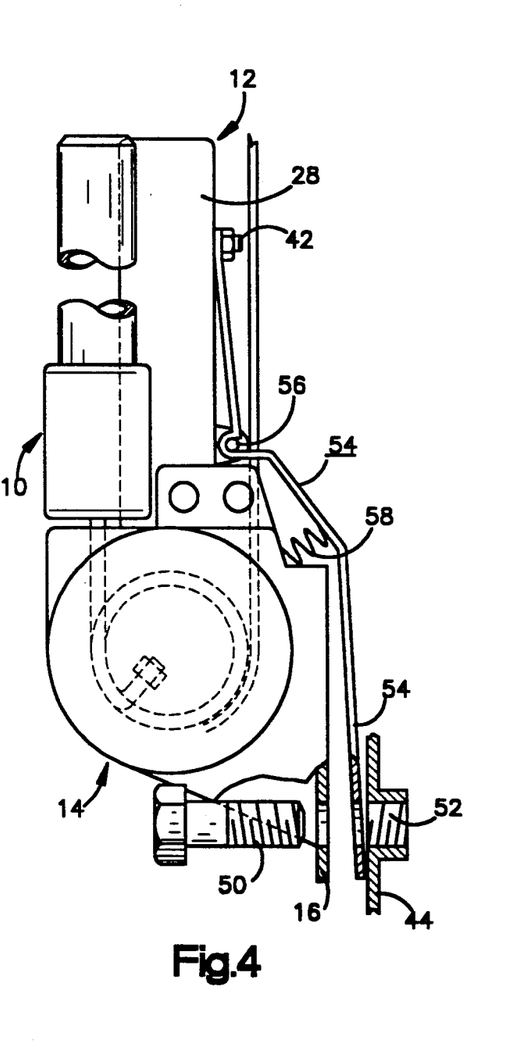
Figure 5:
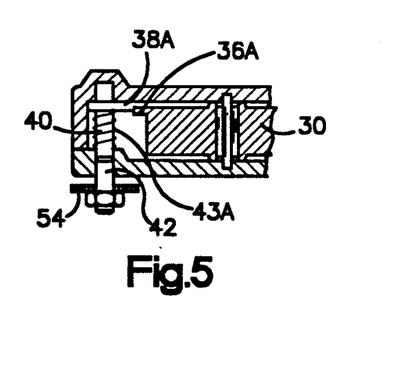

The embodiment according to FIGS. 3 to 5 differs from that according to FIGS. 1 and 2 only in the means with which the securing and cancelling of the securing of the inertia mass 30 are effected. Consequently, only these means will be described here.

The securing of the assembly consisting of the pretensioner 10, control mechanism 12 and belt retractor 14 to the mounting surface 44 of the vehicle bodywork is done by means of a mounting screw 50 which is led through an opening of the mounting flange 16 of the belt retractor 14 and is screwed into a threaded bore 52 on the vehicle bodywork. On the housing 28 of the control mechanism 12 a two-armed sensing lever 54 is pivotally mounted on a bearing pin 56. The one arm of the sensing lever 54 is forked a its free end and engages beneath the end of the pin-shaped control element 40 projecting out of the housing 28, said end being widened or provided with a screwed-on nut. The other lever arm of the sensing lever 54 has a bent flat end in the form of a lug 54A which is provided with a passage hole for the mounting screw 50. Said lug 54A is pressed by a pressure spring 58 away from the mounting flange 16 as long as the assembly is not screwed to the mounting surface 44 of the vehicle bodywork. On mounting, the lug 54A is disposed between the mounting flange 16 and the mounting surface 44, so that on tightening the mounting screw 50 the lug 54A is pressed against the surface of the mounting flange 16 opposite said lug. At the same time, via the end of the other lever arm of the sensing lever 54 a tension is exerted on the outer end of the control element 40. In contrast to the embodiment according to FIGS. 1 and 2, the inertia mass 30 is provided with a configuration in the form of a blocking nose 36A. In the condition shown in FIGS. 3 and 5 the pin-shaped control element 40 engages with its perpendicularly projecting blocking extension 38A behind the blocking nose 36A to secure the inertia mass 30. When a tension is exerted on the control element 40 via the sensing lever 54, the blocking extension 38A frees itself from the blocking nose 36A against the action of a pressure spring 43A in order to release the inertia mass 30.

Figure 6:
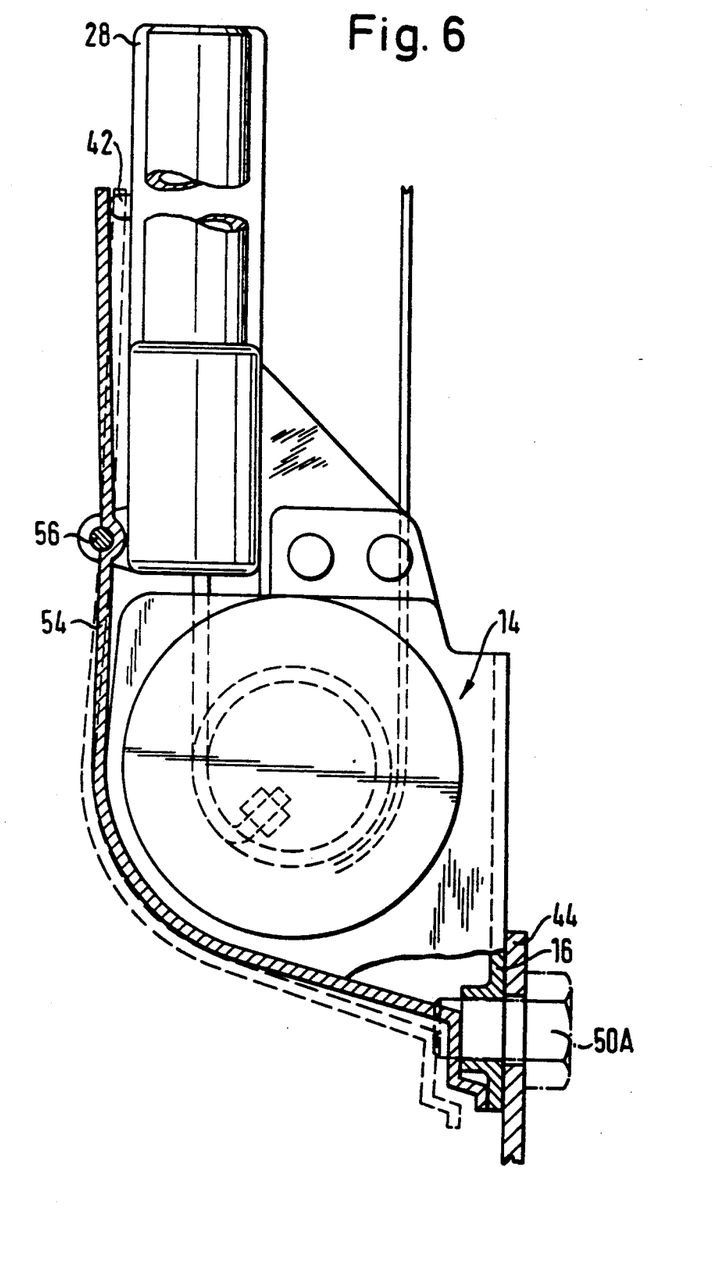
FIG. 6 shows a variant of the same embodiment.

FIG. 6 shows a variant of the embodiment shown in FIGS. 3 to 5. In this variant the end of the control element formed as sensing pin 42 projecting out of the housing 28 of the drive mechanism bears on the free end of the one lever arm of the two-armed sensing lever 54; the other lever arm of the sensing lever 54 is curved corresponding to the outer contour of the belt retractor 14 and led up to the vicinity of the mounting flange 16 thereof. There it forms a pressure lug for the end of a mounting screw 50A which is screwed into a threaded bore of the mounting flange 16 and projects with its free end out of said threaded bore. In FIG. 6 the position of the sensing lever 54 prior to assembly is shown in unbroken lines; the position after assembly is indicated in dashed lines. After the assembly the sensing lever 54 is pivoted clockwise so that it presses the sensing pin 42 towards the interior of the housing 28. In a manner similar to the embodiment according to FIGS. 1 and 2, in this embodiment a sensing pin 42 projecting out of the housing 28 is employed but said sensing pin is not actuated directly but indirectly via the sensing lever 54.

FIGS. 7 to 14 show two variants of a drive mechanism which is secured separately from the tightening means to the vehicle bodywork. In both cases the inertia mass 30 is connected via a sheathed cable 60 to the tightening means (not illustrated).

In the embodiment according to FIGS. 7 to 10 the vehicle-sensitive inertia mass 30 is guided for translational displacement in the housing 28. In a laterally fitted housing cover 29 a blind bore 28C is formed in which a cylindrical guide pin 30A of the inertia mass 30 is slidingly guided. The guide pin 30A is provided with a radially recessed annular groove 62 into which the center region of a leaf spring 64 fixedly clamped in the housing 28 engages. The free end of said leaf spring 64 lies opposite and a small distance from the inner cylindrical headpiece 42A of a sensing pin 42 which projects out of a mounting surface 28A of the housing 28.

Figure 7:
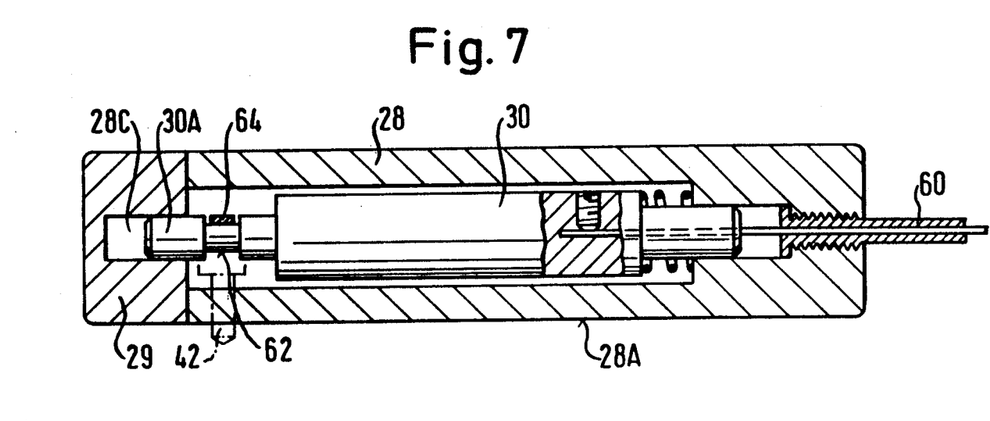
FIGS. 7 to 10 show an embodiment of a control mechanism with translationally displaceable inertia mass in two sectional views, a plan view and an exploded view.
Figure 8:
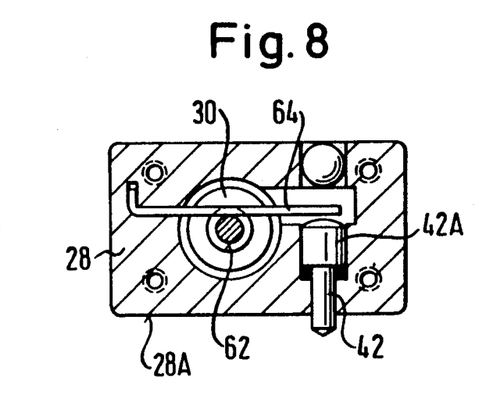
Figure 9:
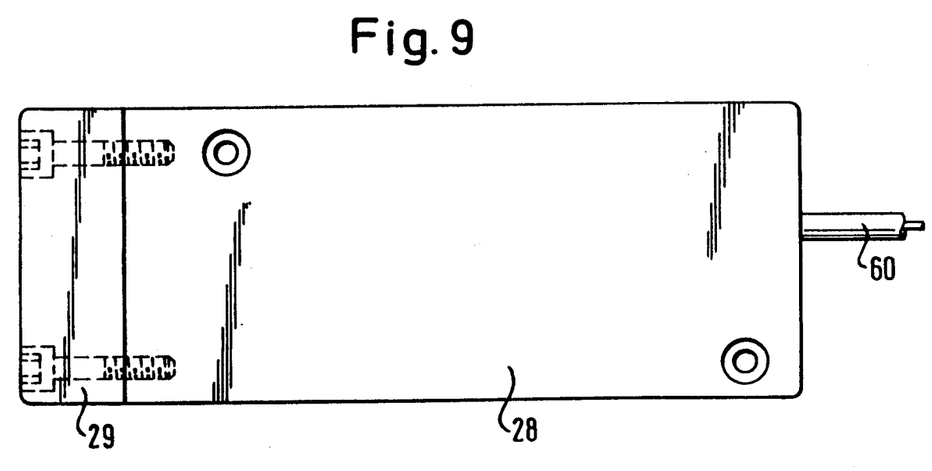
Figure 10:
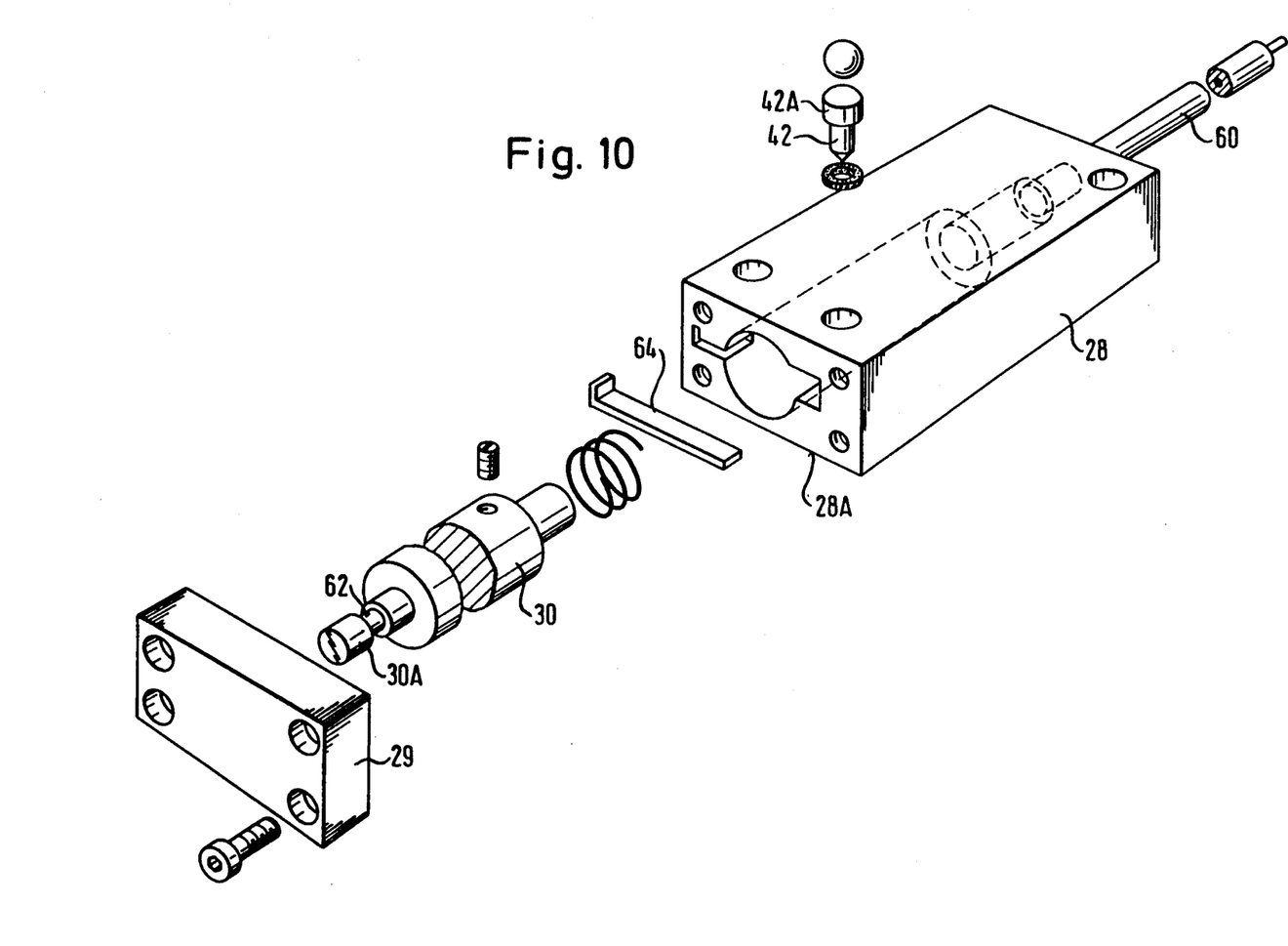
Figure 11:
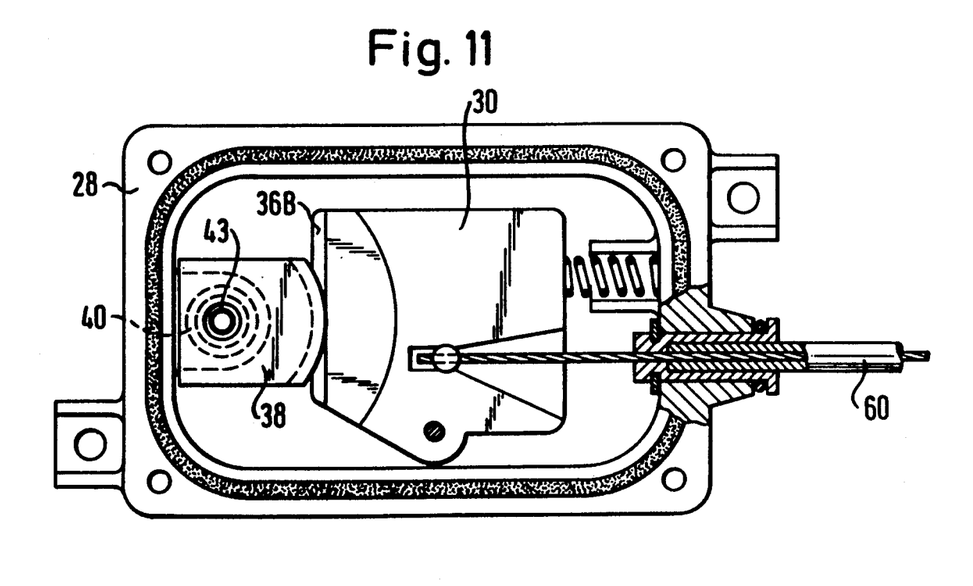
FIGS. 11 to 14 show an embodiment of a control mechanism with pivotal inertia mass in three sectional views and an exploded view.
Figure 12:
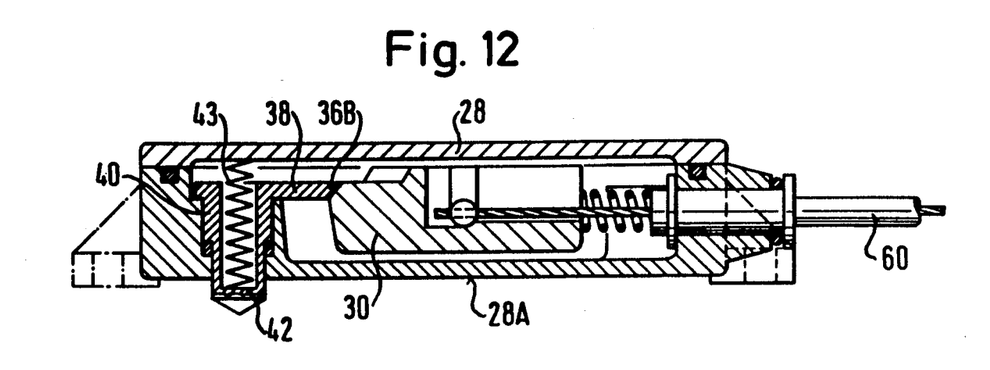
Figure 13:
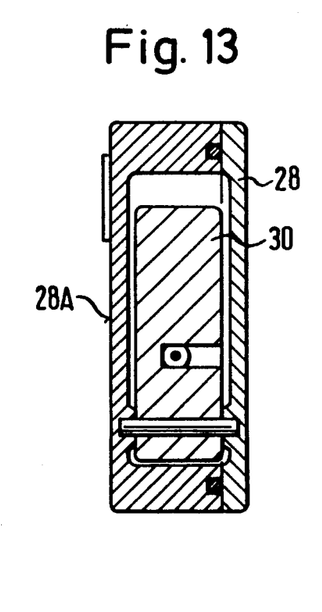
Figure 14:
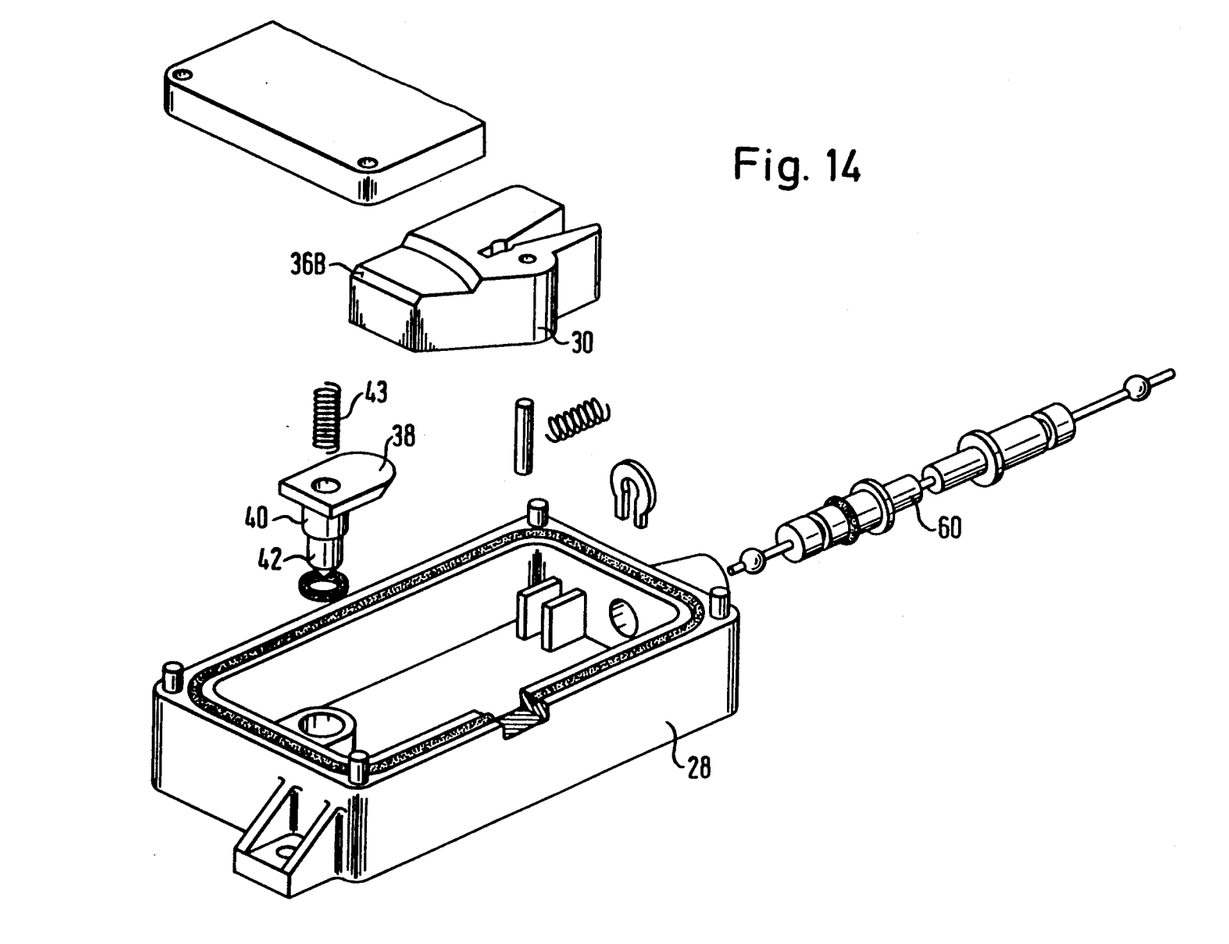

In the condition which is shown in FIGS. 7 and 8 the leaf spring 64 engages into the annular groove 62 for securing the inertia mass 30 in its readiness position. When on mounting of the housing 28 on a surface of the vehicle bodywork the mounting surface 28A is brought up to the counter surface, the sensing pin 42 first comes into contact with said counter surface, whereupon finally the sensing pin 42 is pressed into the interior of the housing 28 and with its cylindrical headpiece 42A engages the end of the leaf spring 64 to move the latter out of the annular groove 62 so that the inertia mass 30 is no longer secured.

In the embodiment according to FIGS. 11 to 14 the inertia mass 30 is pivotally mounted in the housing 28. Analogously to the embodiment of FIGS. 1 and 2, the control element 40 is formed as hollow pin, the cavity of which accommodates a pressure spring 43 which bears on the inner surface of the housing 28. The outer end of the control element 40, formed as sensing pin 42, projects out of the mounting surface 28A of the housing 28. Also formed integrally with the control element 40 is the blocking extension 38 which projects perpendicularly from the inner end thereof and which at its free end cooperates with a corresponding configuration of the inertia mass 30. In this case said configuration has the form of a ramp 36B. In the secured position shown in FIGS. 11 and 12 the free end of the blocking extension 38 is in engagement with said ramp 36B and holds the inertia mass 30 in its secured position. On mounting of the housing 28 on a counter surface of the vehicle bodywork, the sensing pin 42 is pressed in, the blocking extension 38 thereby coming free of the ramp 36B and the securing of the inertia mass 30 being cancelled.

The sensing pin 42 is conically tipped at its free end. The pressure spring 43 is dimensioned relatively hard, so that pressing the sensing pin 42 in by hand is very painful and is thus practically impossible. There is therefore no danger of any unintentional cancelling of the securing when handling the control mechanism before mounting thereof.

I claim:

1. A safety mechanism for a pretensioner in a vehicle safety belt restraining system, the safety belt restraining system including a belt retractor and a pretensioner drive integrated with the belt retractor to form a single assembly unit having a mounting flange, the safety belt restraining system further including a vehicle sensitive inertial mass member movably accommodated in a housing, said safety mechanism comprising:
   a blocking member for blocking actuation of said pretensioner, said blocking member being movable into a position engaging said mass member to block movement of said mass member until the assembly unit is mounted on a body portion of the vehicle;
   a control element engaging said blocking member for controlling the position of said blocking member and displaceably mounted in a wall of said housing and extending outwardly through said wall from the interior of the housing, said control element being movable between a first position in which said blocking member engages said mass member and a second position in which said blocking member is disengaged from said mass member; and
   a two-armed sensing lever pivotally mounted on said housing for moving said control element, said lever having a first arm with a sensing lug on its free end adjacent the mounting flange of said assembly unit and a second arm engaging said control element.

2. The safety mechanism of claim 1, wherein said first lever arm has a bent portion extending around a portion of the belt retractor.

3. The safety mechanism of claim 1, wherein said sensing lug is movable between a first position spaced from the mounting flange prior to the mounting of the assembly unit to the vehicle body portion and a second position in contact with the mounting flange after mounting of the assembly unit to the vehicle body portion.

4. The safety mechanism according to claim 1, wherein the assembly unit includes a bolt for interconnecting the vehicle body portion and the assembly unit, said bolt being received in a threaded opening of the mounting flange, said bolt engaging said sensing lug to move said sensing lug into its second position on mounting of the assembly unit to said vehicle body portion.

5. A vehicle sensitive mechanism for a pretensioner in a vehicle safety belt system, comprising:
   a housing having a wall with a mounting surface;
   an inertial mass member movably mounted in said housing;
   spring means biasing said inertial mass member to a rest position in said housing;
   a sheathed cable connecting said inertial mass member to the pretensioner;
   a sensing pin displaceably mounted in said housing wall, said sensing pin having a first end movable between a first position projecting from said mounting surface when said housing is not mounted to a vehicle body portion and a second position pressed towards the interior of said housing when said housing is mounted on said vehicle body portion;
   said mass member having surfaces defining a recess therein;
   a blocking member disposed in said housing and having a portion received in said recess of said mass member to hold said mass member in its rest position;
   said sensing pin having a second end disposed within said housing and engaging said blocking member, said sensing pin moving said blocking member portion from said recess in said mass member when said sensing pin is pressed toward the interior of said housing to allow movement of said mass member and of its rest position.

6. The mechanism according to claim 5 wherein said housing has surfaces defining a cylindrical bore therein, said mass member being slidable in said cylindrical bore of said housing.

7. The mechanism according to claim 6 wherein said blocking member comprises a leaf spring having a first end fixed to said housing and a second end disposed in said recess of said mass member, said leaf spring extending in a direction transverse to the longitudinal axis of said mass member.

8. The mechanism according to claim 5, wherein said mass member is pivotally mounted in said housing, said sensing pin inner end having an integrally formed laterally projecting extension which forms said blocking member portion.

* * * * *